United States Patent [19]

Eder

[11] Patent Number: 4,612,766
[45] Date of Patent: Sep. 23, 1986

[54] APPARATUS FOR COMPENSATING FOR VARIATIONS IN PRESSURE AND FLOW IN FUEL SUPPLY SYSTEMS OF GAS TURBINE ENGINES

[75] Inventor: Wolf-Dieter Eder, Dachau, Fed. Rep. of Germany

[73] Assignee: MTU, Munich, Fed. Rep. of Germany

[21] Appl. No.: 691,547

[22] Filed: Jan. 15, 1985

[30] Foreign Application Priority Data

Jan. 17, 1984 [DE] Fed. Rep. of Germany ....... 3401397

[51] Int. Cl.$^4$ ............................................... F02K 3/10
[52] U.S. Cl. ........................................ 60/261; 60/734; 137/493.6; 137/568
[58] Field of Search ............... 60/261, 734; 137/493.3, 137/493.4, 493.5, 493.6, 568

[56] References Cited

U.S. PATENT DOCUMENTS

| 2,640,316 | 6/1953 | Neal | 60/39.281 |
| 3,231,046 | 1/1966 | Ohrnberger | 137/568 |
| 3,324,883 | 6/1967 | Mercier | 137/493.6 |
| 3,572,381 | 3/1971 | Nash | 137/568 |
| 3,896,845 | 7/1975 | Parker | 137/493.6 |
| 4,229,939 | 10/1980 | Smith | 60/261 |

Primary Examiner—Louis J. Casaregola
Attorney, Agent, or Firm—Roberts, Spiecens & Cohen

[57] ABSTRACT

A device for compensating variations in pressure and flow in fuel supply systems of gas-turbine engines comprising a pump for supply of fuel under pressure into a fuel line and an accumulator which can be connected to the fuel line as a function of operating conditions. An accumulator disconnection valve relieves the accumulator from existing variations in pressure in the supply system and serves as a shutoff valve controlled by pressure differential between the fuel line and the accumulator. The valve comprises two valve members which are connected opposite each other and are spring-loaded in directions opposite each other.

11 Claims, 3 Drawing Figures

APPARATUS FOR COMPENSATING FOR VARIATIONS IN PRESSURE AND FLOW IN FUEL SUPPLY SYSTEMS OF GAS TURBINE ENGINES

FIELD OF THE INVENTION

The present invention relates to apparatus for compensating for variations in pressure and flow in liquid feed systems of machines, in particular in fuel supply systems of gas-turbine and jet engines, in which, in addition to a pump supply, an accumulator feed is provided which can be connected as a function of operating conditions.

BACKGROUND

Fuel supply systems, for instance, for jet engines, and particularly for those with after-burning are provided with accumulators, in order to assure feed of the necessary amount of fuel into the after-burner. For example, an amount of several liters, i.e. about 5 liters, is needed within a short time, for example, less than one second. In view of this relatively brief, high fuel requirement for the after-burner, the accumulator is intended to prevent a disturbing drop in pressure in the fuel supply system. The accumulator can comprise a rubber bag which can be filled, for instance, with nitrogen and presses the above-mentioned amount of fuel into the system upon a drop in pressure in the fuel line. As soon as the fuel system has recovered due to acceleration of the column of fuel in the feed line, the accumulator fills up again. Upon change-over from the after-burner state to the normal state of operation of the engine, the accumulator absorbs pressure peaks.

In all such fuel systems with pump feed, small variations in pressure occur (typically 0.1 bar to 0.3 bar) caused by the feed pump or else by the engine. The bag in the accumulator reacts to these variations in pressure with corresponding changes of volume, i.e. small amounts of fuel are constantly moved back and forth in the fuel supply system and are detected and processed together with the amount actually flowing to the engine. Due to the superimposition, variations in flow and measurement errors of the flow measurement system are produced.

SUMMARY OF THE INVENTION

An object of the invention is so to provide a valve system by which the accumulator remains unaffected by the relatively small variations of pressure caused by the pump and machines or engine.

This and further objects are obtained according to the invention by the provision of accumulator disconnection valve means for relieving the accumulator from existing variations in pressure in the fuel supply line.

In this way, it is possible to eliminate the pressure variations and measurement errors in relatively simple manner.

In accordance with an embodiment of a valve means according to the invention, there is the possibility of filling or emptying the accumulator by means of the pressure differential between the accumulator emptying pressure, on the one hand, and the pump delivery pressure, on the other hand, or of shutting the accumulator off from the pump feed such that a pressure differential in the fuel supply line which is larger than pressure variations which occur in the system is always required for the filling of the accumulator. As long as the opening pressure of the valve is greater than the variations in pressure prevailing in the fuel line in front of the valve, such pressure variations are not capable of filling the accumulator or of causing disadvantageous sensitive reactions. By proper selection of the opening pressures of the valve, its optimal adjustment to the operational requirements can be obtained, in particular by the possibility of correcting the initial tension of compression springs without impairing the basic function of the accumulator.

According to the invention, a relatively simply constructed valve which is controlled by pressure differential can be provided, which either can be closed upon slight differences in pressure or can optionally be traversed by fuel flow in one direction of flow (accumulator filling) or the other (accumulator emptying).

The individual valve members or valves as well as all the essential valve parts can be assembled or disassembled for easy maintenance by a valve housing structure which is partially dismembered and the parts of which can be quickly fitted to one another in form-locked manner.

BRIEF DESCRIPTION OF THE FIGURES OF THE DRAWING

The invention will be further described with reference to the drawing, in which.

DETAILED DESCRIPTION OF PREFERRED EMBODIMENTS

Figure 1:
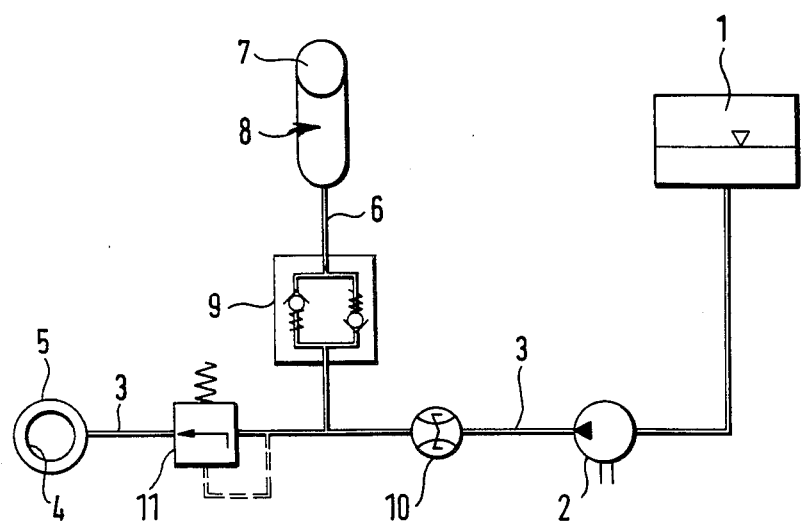
FIG. 1 is a diagram of an after-burner fuel feed system for a jet turbine engine.
Figure 2:
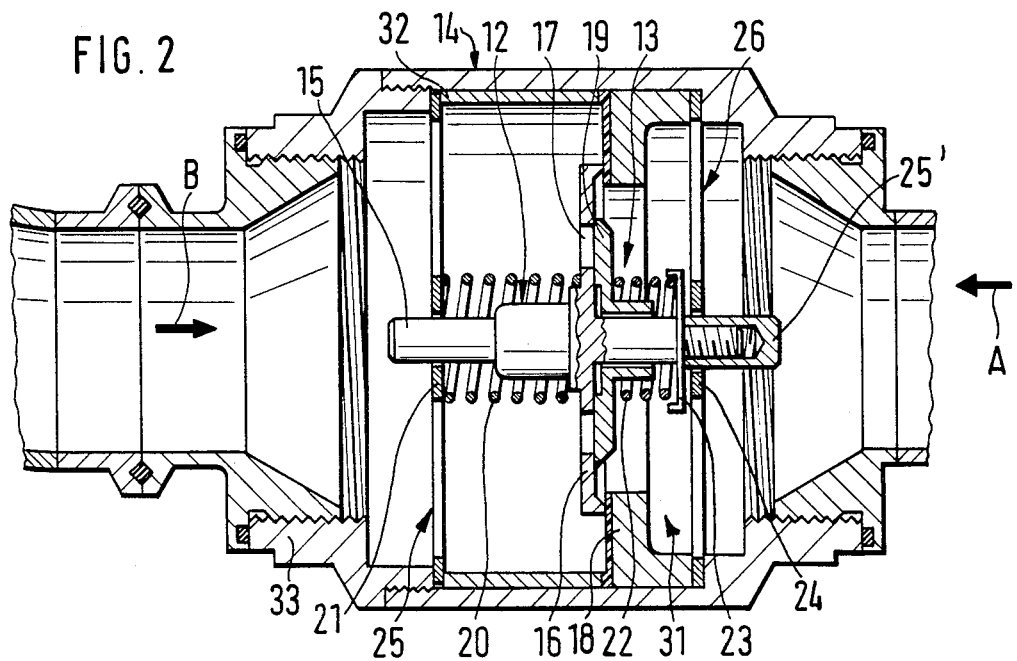
FIG. 2 is a central longitudinal section of an accumulator disconnection valve according to a first embodiment of the invention.
Figure 3:
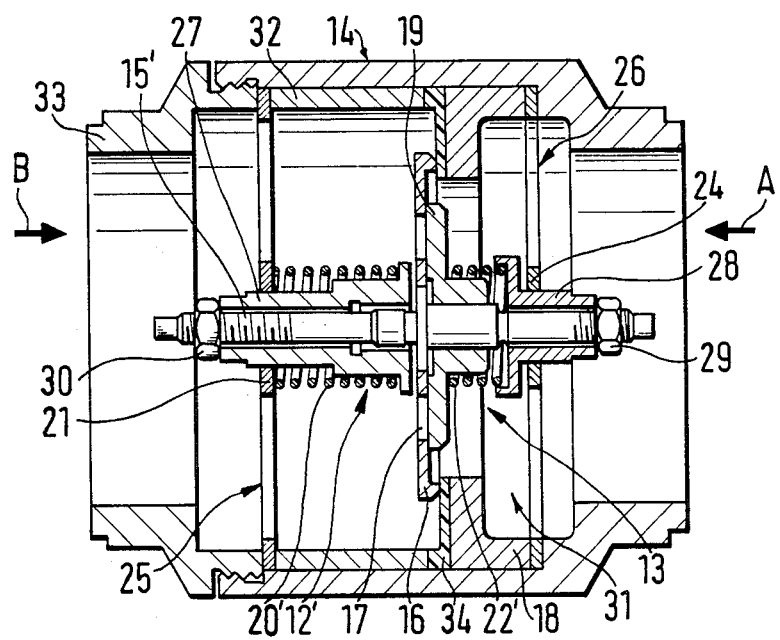
FIG. 3 shows another embodiment of an accumulator disconnection valve, also in central longitudinal section, similar to that in FIG. 2 but capable of adjustment.

In FIG. 1 there is seen an after-burner fuel feed system of a jet turbine engine in which fuel in a tank 1 is pumped by pump 2 via a supply line 3 to a fuel injection means constituted by an injection ring 4 of the after-burner 5. In the vicinity of the engine, the feed line 3 communicates, via a further line 6, with an accumulator 8 which contains a nitrogen bag 7. An accumulator disconnection valve 9, which is shown diagrammatically in FIG. 1 and in more detail in FIGS. 2 and 3, is connected in line 6 between the accumulator 8 and the fuel supply line 3. The accumulator disconnection valve 9 operates automatically as a function of the difference in pressure between the delivery pressure of the accumulator, on the one hand, and the fuel pump feed pressure, on the other hand. The fuel supply line 3 furthermore incorporates a flow measurement device 10 connected downstream of the tank pump 2 and a pressure-regulating valve 11 connected in front of the fuel injection ring 4, which is also known as a so-called "dome pressure reducer."

Within the scope of the basic concept of the invention, the accumulator disconnection valve 9 is intended to relieve the accumulator 8 or its nitrogen-filled rubber bag 7 from pressure variations of approximately 0.1 to 0.3 bar in the supply system. Namely, the accumulator 8 is disconnected from the fuel pump feed as long as the valve opening pressure is greater than the pressure variations in front of the valve 9.

According to FIG. 2, the accumulator disconnection valve 9 consists of two valve members 12, 13 which are connected in opposition to each other and spring-loaded in directions opposite to each other and by which fluid can traverse valve 9 via valve members 12 and 13 in one direction (emptying direction A), for instance in responding to a predetermined accumulator delivery pressure or, merely via valve member 13 which responds, for instance, to a predetermined filling pressure, in the opposite direction (filling direction B).

The valve member 12 comprises a valve stem 15 which is guided for axial displacement centrally within the valve housing 14 and a valve-seat plate 16 which is provided with a plurality of openings 17 forming a common total flow cross section and which can be sealingly engaged, at its outer radial wall region, in the valve shutoff condition or the accumulator filling condition against a collar 18 which symmetrically projects radially inwards in the housing. The valve 13 is separately guided for axial displacement on a prolongation of the valve stem 15 which extends in axial direction beyond the valve-seat plate 16 of valve part 12 and valve 13 has a pressure plate 19 by which the openings 17 in the adjacent valve-seat plate 16 can be closed in the valve shutoff condition and accumulator emptying condition or can be opened for the filling of the accumulator. In FIG. 2, the position of the two valve members 12, 13 is shown in the valve shutoff position; the fluid flow cross section required for the emptying of the accumulator is opened by a displacement of the valve-seat plate 16 away from the collar 18, the openings 17 remaining closed by pressure plate 19. Therefore, both valve members 12, 13 are moved simultaneously and jointly against the initial tension of compression spring 20.

As shown in FIG. 2, one end of the compression spring 20 of valve member 12 rests against the rear wall of the seat plate of valve member 12 while the other end rests against a disk-like section 21 which is fixed to the housing. One end of the compression spring 22 of the valve member 13 rests against the rear wall of the pressure plate 19 of valve member 13 while its other end rests against a spring stop 23 which is coupled to the extension of valve stem 15 of valve member 12.

FIG. 2 furthermore shows another disk-like section 24 which is fixed to the housing and which, together with the disk-like section 21, serves as an axial guide for the valve stem 15 and its extension. More particularly, the extension portion of the valve stem 15 which extends from the spring stop 23 on the right side thereof in FIG. 2 is guided in axially displaceable manner in the corresponding disk-like section 24 via a bushing 25'.

Each of the two disk-like sections 21, 24 is a part of the disk bodies 25, 26 which extend in the valve housing 14 in transverse direction and which are cut out for the flow through the valve and are fixed or firmly clamped to the valve housing 14 in the region of their corresponding outer edges.

Using the same reference numbers with primes for functionally identical or equivalent parts, FIG. 3 shows essentially, as compared to FIG. 2, a modification in which the specific initial pressure of the compression spring is adjustable in accordance with operating conditions.

For this purpose, in the embodiment shown in FIG. 3, a clamping sleeve 27 is screwed onto valve stem 15 of valve member 12 on one side thereof, while a bushing 28 is placed on the other side to receive the extension of the valve stem 15'. Clamping sleeve 27 and bushing 28 are further constructed to support one end each of the corresponding compression springs 20' and 22' and for axial guidance of the valve; the initial tension of compression spring 22' can be corrected by a nut 29 which is threaded onto the extension of the valve stem 15' on the side of bushing 28 while the initial tension of the compression spring 20' can be adjusted by means of the clamping sleeve 27, after, in the latter case, a nut 30 threaded onto the other end of the valve stem 15' has been loosened.

As is furthermore clear from FIGS. 2 and 3, the collar 18 which projects radially into the interior of the housing can be a part of a ring-shaped housing insert 31 which can be securely fixed to the valve housing 14 between a spacer sleeve 32 inside the housing, on the one hand, and the external circumferential wall of the one disk member 26, on the other hand. The other disk member 25 can be securely fixed between the other free end of the spacer sleeve 32 and an adjacent end surface of a detachable structural part 33 of the housing.

As can be further seen, in particular in FIG. 3, the collar 18 of the ring-shaped insert 31 can be provided with a soft, elastic sealing collar 34 on its side surface facing the valve-seat plate 16. The sealing collar 34 can be constructed as a replaceable component or it can be made from the very start as a part of the ring-shaped insert 31. Alternatively, the collar could be produced, for instance, by spraying it on the insert 31.

The separation of the valve housing structure into parts as shown in FIGS. 2 and 3 provides comparatively simple assembly and disassembly of the valve; after loosening of the structural part 33 of the housing, the parts 25, 32, 31, 26—from right to left, along with the valve members 12 and 13 (or 12' and 13') can easily be removed from the valve housing 14 or, be reassembled, in reverse sequence from left to right.

Although the invention has been described in conjunction with specific embodiments thereof, it will become apparent to those skilled in the art that numerous modifications and variations can be made within the scope and spirit of the invention as defined in the attached claims.

What is claimed is:

1. Apparatus for compensating for variations in pressure and flow in fuel supply systems of gas-turbine and jet engines, comprising a pump feed means for feeding liquid under pressure in a supply line, an accumulator feed means connectible to said supply line depending upon operating conditions to supplement liquid feed or to receive liquid, and accumulator disconnection valve means connected to said accumulator feed means and to said supply line for selectively and automatically connecting the accumulator feed means and the supply line in response to pressure difference therebetween while relieving the accumulator feed means from existing variations in pressure in the liquid feed, said valve means comprising first and second, opposed valve members supported for independent relative movement, first and second spring members respectively acting on said first and second valve members to urge the same into engagement with one another, said first and second valve members being displaceable in response to pressure difference between the accumulator feed means and said supply line, said valve members having a first position engaged with one another for blocking communication between said accumulator feed means and said supply line, a second position in which both valve members remain engaged with one another but are displaced together to permit flow from the accumulator feed means to said supply line and a third position in which one valve member is displaced with respect to the other valve member to permit flow from said supply line to said accumulator feed means, a housing in which said valve members are displaceable, said first valve member including a stem guidably supported in said housing and an extension slidably supporting said second valve member, said first valve member comprising a valve seat plate having opening means through which liquid can flow, a collar in said housing, said valve seat plate being urged by said first spring member towards said collar and being in sealing contact with said collar in said first and third positions, said second valve member including a pressure plate urged by said second spring member towards said valve seat plate and being engaged with said valve seat plate of said first valve member to block said opening means in said first and second positions and to be displaced from said valve seat plate against the opposition of said second spring member in said third position.

2. Apparatus as claimed in claim 1 wherein said collar projects radially inwards into said housing symmetrically.

3. Apparatus as claimed in claim 1 comprising a seat plate in said housing facing said valve seat plate of said first valve member in spaced relation, said first spring member having ends respectively bearing against said seat plate and said valve seat plate of said first valve member.

4. Apparatus as claimed in claim 3 comprising a spring stop in said housing coupled to said extension and facing said pressure plate of said second valve member in spaced relation, said second spring member having ends respectively bearing against said pressure plate and said spring stop.

5. Apparatus as claimed in claim 4 wherein said stem is slidably supported in said seat plate, said valve means further comprising a second seat plate facing said spring stop and slidably supporting said extension.

6. Apparatus as claimed in claim 5 wherein said first and second seat plates are secured transversely in said housing and respectively include central disk-like sections and openings around said central disk-like sections through which liquid can freely pass.

7. Apparatus as claimed in claim 5 comprising means for adjusting the tension of said first and second spring members.

8. Apparatus as claimed in claim 11 wherein the means for adjusting the tension of the said first and second spring members comprises a clamping sleeve engaged on said stem and intercepting the end of the said first spring member remote from the first said seat plate, a bushing on said extension integrally secured with said spring stop and means threaded on said extension and bearing against said bushing.

9. Apparatus as claimed in claim 8 wherein said means threaded on said extension comprises a first nut, said valve means further comprising a locking nut on said stem bearing against said clamping sleeve.

10. Apparatus as claimed in claim 5 wherein said housing comprises a detachable part, said valve means further comprising an annular housing insert to which said collar is integrally secured, and a spacer sleeve secured between said detachable part and said insert, said first seat plate being secured between said detachable part and said spacer sleeve, said second seat plate being secured between said insert and said housing.

11. Apparatus as claimed in claim 1 for use in a fuel supply system for the after-burner of a jet turbine engine, comprising a fuel supply line containing said pump means and extending from a fuel tank to a fuel injection means of the engine, said accumulator disconnection valve means being connected between said accumulator means and said fuel supply line and operating automatically as a function of pressure difference between the pressure in said accumulator feed means and the pressure in said fuel line produced by said pump feed means.

* * * * *